United States Patent
Hagari

(10) Patent No.: US 6,988,483 B1
(45) Date of Patent: Jan. 24, 2006

(54) CONTROL APPARATUS FOR AN INTERNAL COMBUSTION ENGINE

(75) Inventor: Hideki Hagari, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/965,859

(22) Filed: Oct. 18, 2004

(30) Foreign Application Priority Data

Jul. 14, 2004 (JP) .............................. 2004-207126

(51) Int. Cl.
*F02P 5/152* (2006.01)
*G01L 23/22* (2006.01)

(52) U.S. Cl. .......................... 123/406.16; 123/406.34; 73/35.03; 73/35.11; 73/117.3

(58) Field of Classification Search ........... 123/406.16, 123/406.29, 406.34, 406.35, 406.36, 406.37, 123/435, 488; 73/35.03, 35.05, 35.08, 35.09, 73/35.1, 35.11, 35.12, 35.13, 117.3, 118.2
See application file for complete search history.

(56) References Cited

U.S. PATENT DOCUMENTS

| 4,357,825 | A | * | 11/1982 | Yamaguchi et al. | ........ 73/35.09 |
| 4,408,479 | A | * | 10/1983 | Asai et al. | .................. 73/35.13 |
| 4,513,716 | A | * | 4/1985 | Haraguchi et al. | ..... 123/406.36 |
| 4,640,250 | A | * | 2/1987 | Hosaka et al. | .......... 123/406.35 |
| 4,750,103 | A | * | 6/1988 | Abo et al. | ............. 123/406.37 |
| 4,788,957 | A | * | 12/1988 | Komurasaki | ........... 123/406.16 |
| 4,895,120 | A | * | 1/1990 | Tobinaga et al. | ...... 123/406.35 |
| 5,404,854 | A | * | 4/1995 | Kamabora et al. | ..... 123/406.16 |
| 5,925,819 | A | * | 7/1999 | Yoshinaga et al. | ......... 73/35.08 |

FOREIGN PATENT DOCUMENTS

| JP | 60-100021 | A | | 6/1985 |
| JP | 4-325754 | A | * | 11/1992 |
| JP | 3144057 | B2 | | 1/2001 |
| JP | 3438312 | B2 | | 6/2003 |

* cited by examiner

Primary Examiner—Willis R. Wolfe, Jr.
(74) Attorney, Agent, or Firm—Sughrue Mion, PLLC

(57) ABSTRACT

To provide a control apparatus for an internal combustion engine which can judge an abnormality regardless of one line type or two line type, and can also detect the classification of abnormality. The control apparatus includes: a knock sensor having a piezoelectric element for detecting vibrations that are generated in the internal combustion engine, and a resistor that is connected in parallel with the piezoelectric element; and an interface circuit that detects a knock in accordance with an output from the knock sensor and detects an abnormality of the knock sensor, and the interface circuit includes a bias unit that conducts biasing by pulling up and pulling down an output from the knock sensor, and detects the abnormality of the knock sensor with a direct current component of the bias unit.

4 Claims, 3 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine, and more particularly to a control apparatus for an internal combustion engine for detecting the abnormality of a knock sensor.

2. Description of the Related Art

In recent years, a so-called knock control system capable of detecting the knock of an internal combustion engine and of controlling an ignition timing is applied to a large number of control apparatuses for internal combustion engines. Also, as a method of judging the abnormality of a knock sensor for detecting the vibrations of an internal combustion engine, there is a method including: biasing a knock sensor with a resistor by pulling up within an interface (hereinafter referred to as "I/F") circuit of a control apparatus; and detecting a direct current component of the bias voltage, to thereby detect the abnormality of the knock sensor (for example, refer to JP 60-100021 A).

In the above-mentioned conventional control apparatus for an internal combustion, a built-in resistor is connected in parallel with the knock sensor, one end of the resistor is connected to a ground level through a sensor main body, and only the other end of the resistor is connected to the control apparatus through a harness. The I/F circuit of the control apparatus is pulled up to, for example, 5 V through a resistor having the same resistance as that of the built-in resistor of the knock sensor. Then, only an alternating current component is allowed to pass through a signal processing circuit for detecting the knock through a capacitor, and a signal from which the alternating current component has been removed through a low pass filter that is made up of a resistor and a capacitor is outputted to an abnormality judging A/D of the knock sensor.

However, in the conventional control apparatus for an internal combustion engine, for example, an A/D value obtained from the abnormality judging A/D when abnormality occurs in a harness portion becomes the same value, for example, 5 V, at the time of power supply short-circuiting and at the time of breaking. Therefore, it cannot be discriminated whether the abnormality is derived by power supply short-circuiting or breaking. The A/D value may become 5 V or higher (for example, 12 to 14 V of a battery voltage) in the normal power supply short-circuiting. However, in general, the maximum voltage of A/D is frequently limited to 5 V in order to protect a microcomputer. Therefore, it is hereinafter assumed that a value that has been thus limited is the A/D value in the present specification.

Also, the types of the knock sensor include: a type in which one end of the resistor is connected to the ground level whereas one line of only the other end outputs a sensor signal; and a type in which two lines that are isolated from a constant voltage system such as the ground level output sensor signals. In the case of the two line type sensor, when the abnormality is going to be judged in the same method as the conventional method, there is proposed, for example, a method in which one of two lines is connected to the ground level within the I/F circuit of the control apparatus, and the other line conducts the abnormality judgment in the same method as the conventional method. However, this method suffers from problems in that the abnormality cannot be judged in the case where the line connected to the ground level is grounded, and the same value obtained at the time of power supply short-circuiting between those two lines becomes identical with that at the time of grounding the sensor output line. In addition, there arises such a problem in that a noise removal effect that is attributable to an input of the outputs from the two lines to a differential amplifier circuit cannot be obtained.

Also, in the case where it cannot be discriminated whether the abnormality is caused by power supply short-circuiting or breaking, even if, for example, a lamp indicative of the abnormality is lighted and the control apparatus is then brought to a dealer, it may take time to investigate an abnormal portion unless an abnormal mode is discriminated. Also, since the knock sensor is basically out of contact with a battery voltage system, there is a strong possibility that the power supply short-circuiting abnormality is caused by a harness or a connector being in contact with the battery voltage system. In addition, such a power supply short-circuiting abnormality may evolve into a serious accident such as excess current flow if the abnormality occurs although the event probability is low.

In addition, most of the breaking abnormalities occur owing to a failure of contact with the sensor, the harness, or the connector, and the breaking abnormality is relatively high in the event probability. However, there is a weak possibility that the breaking abnormality develops into a serious accident by conducting appropriate fail safe processing such as retardation of an ignition timing at the time of occurrence of the breaking abnormality. Under the circumstances, it may be preferably possible to discriminate between the power supply short-circuiting abnormality that is low in the event probability but may develop into a serious accident and the breaking abnormality that is relatively high in the event probability but can surely conduct the fail safe processing.

SUMMARY OF THE INVENTION

The present invention has been made in view of the above problems, and therefore an object of the present invention is to provide a control apparatus for an internal combustion engine which can judge an abnormality regardless of one line type or two line type, and can also detect the classification of abnormality as to the abnormality being any one of power supply short-circuiting, grounding, breaking, and between-two-line short circuiting (in case of two line system).

According to the present invention, there is provided a control apparatus for an internal combustion engine which controls an ignition timing on the basis of the detection of a knock, including: a knock sensor having a piezoelectric element for detecting vibrations that are generated in the internal combustion engine, and a resistor that is connected in parallel with the piezoelectric element; and an interface circuit that detects a knock in accordance with an output from the knock sensor and detects an abnormality of the knock sensor, in which the interface circuit includes a bias unit that conducts biasing by pulling up and pulling down an output from the knock sensor, and detects the abnormality of the knock sensor with a direct current component of the bias unit.

According to the present invention, biasing is conducted by pulling up and pulling down the output from the knock sensor, and the abnormality of the knock sensor is detected according to a direct current component of a bias unit, thereby making it possible to judge the abnormality regardless of one line system or two lines system, and also to classify the abnormality.

DETAILED DESCRIPTION OF THE PREFERRED EMBODIMENTS

Now, a description will be given in more detail of preferred embodiments of the present invention with reference to the accompanying drawings.

First Embodiment

Figure 1:
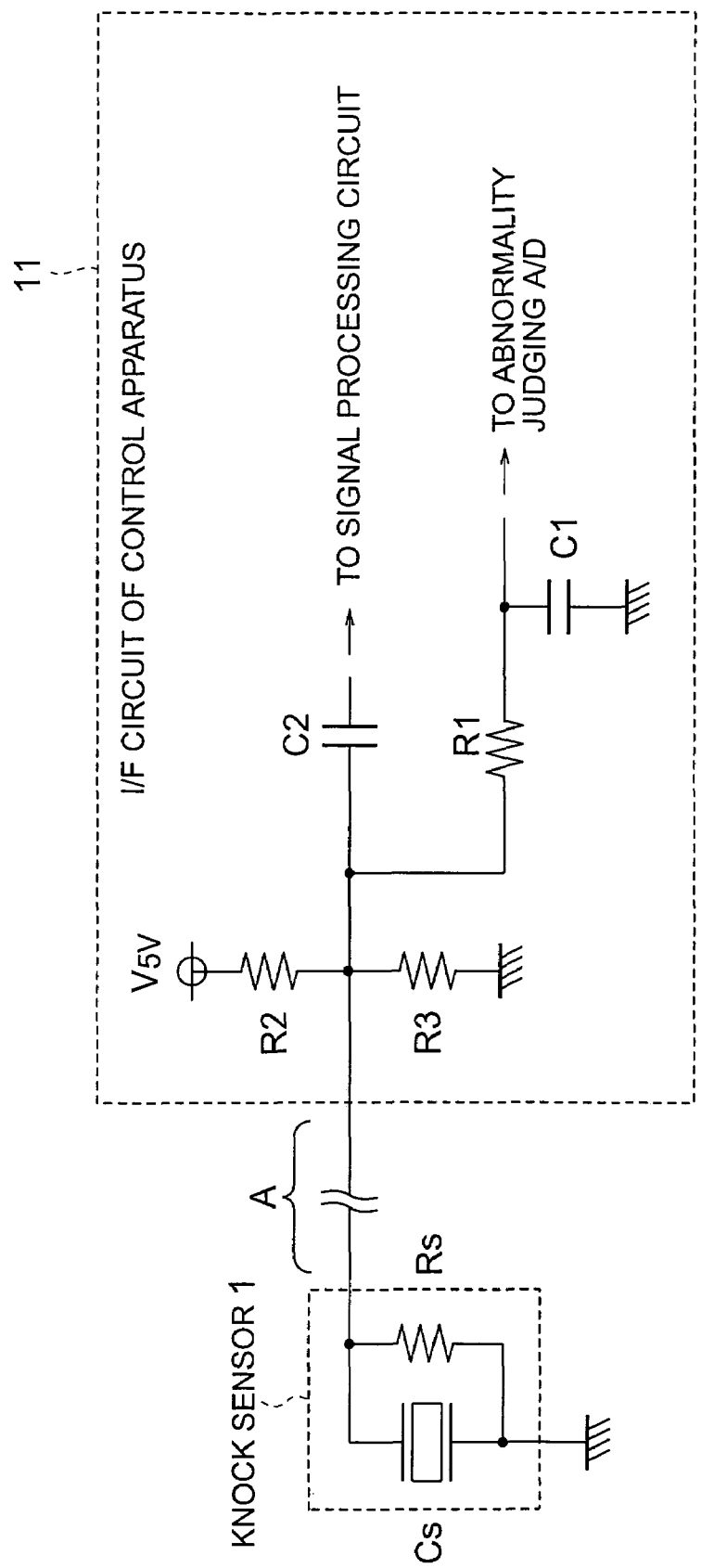
FIG. 1 is a circuit diagram showing the structure of a knock sensor and an I/F circuit portion in a control apparatus for an internal combustion engine in accordance with a first embodiment of the present invention.

FIG. 1 is a circuit diagram showing the structure of a knock sensor and an I/F circuit portion in a control apparatus for an internal combustion engine in accordance with a first embodiment of the present invention. In the first embodiment, as shown in FIG. 1, a resistor Rs is built in a knock sensor 1, and the built-in sensor Rs is connected in parallel with a piezoelectric element Cs. One end of the knock sensor 1 is connected to a ground level through a sensor main body, and only the other end of the knock sensor 1 is connected to an I/F circuit 11 of the control apparatus through a harness indicated by reference A in the figure.

In the I/F circuit 11 of the control apparatus, resistors R2 and R3 structure a bias means, and an output signal from the knock sensor 1 is pulled up to 5 V through the resistor R2 having the same resistance as that of the built-in resistor Rs of the knock sensor 1. At the same time, the output signal is pulled down to the ground level through the resistor R3 having the same resistance as that of the built-in resistor Rs of the knock sensor 1, to thereby conduct biasing.

Also, reference R1 and C1 designate a resistor and a capacitor which structure a low pass filter for removing an alternating current component, and a direct current component of the bias means which has passed through the filter is outputted to an abnormality judging A/D that detects the abnormality of the knock sensor 1. In addition, reference C2 designates a capacitor used for allowing only an alternating current component to pass therethrough, and a signal that has passed through the capacitor C2 is outputted to a signal processing circuit that detects the knock.

With the structure shown in FIG. 1, when the abnormality occurs in the harness portion indicated by reference A in the figure, the abnormality judging A/D value can obtain values shown in Table 1.

TABLE 1

| State | A/D value |
| --- | --- |
| Normal | 1.7 V |
| Power supply short circuiting | 5 V |
| Grounding | 0 V |
| Breaking | 2.5 V |

In this way, when a bias voltage is given, the A/D value becomes 5 V at the time of short circuiting, 0 V at the time of grounding, and 2.5 V at the time of breaking, as shown in the A/D values of Table 1, thereby making it possible to discriminate the abnormality state of power supply short-circuiting, grounding, and breaking.

Therefore, according to the first embodiment, the abnormality of the knock sensor of the one line type is discriminatable with a simple structure, thereby making it possible to discriminate the abnormality of power supply short-circuiting that is low in the event probability but may develop into a serious accident, the abnormality of breaking which is relatively high in the event probability but can surely conduct the fail safe processing, and other abnormalities.

Second Embodiment

The above-mentioned first embodiment shows the type in which one end of the knock sensor 1 is connected to a constant voltage system of the ground level, and one line of only the other end thereof sends an output. In a second embodiment, a description is given of a type in which two lines send outputs in a state where both of ends are isolated from the constant voltage system of the ground level. In this case, the bias means of the I/F circuit pulls up one end of the knock sensor 1 and pulls down the other end thereof, to thereby conduct biasing.

Figure 2:
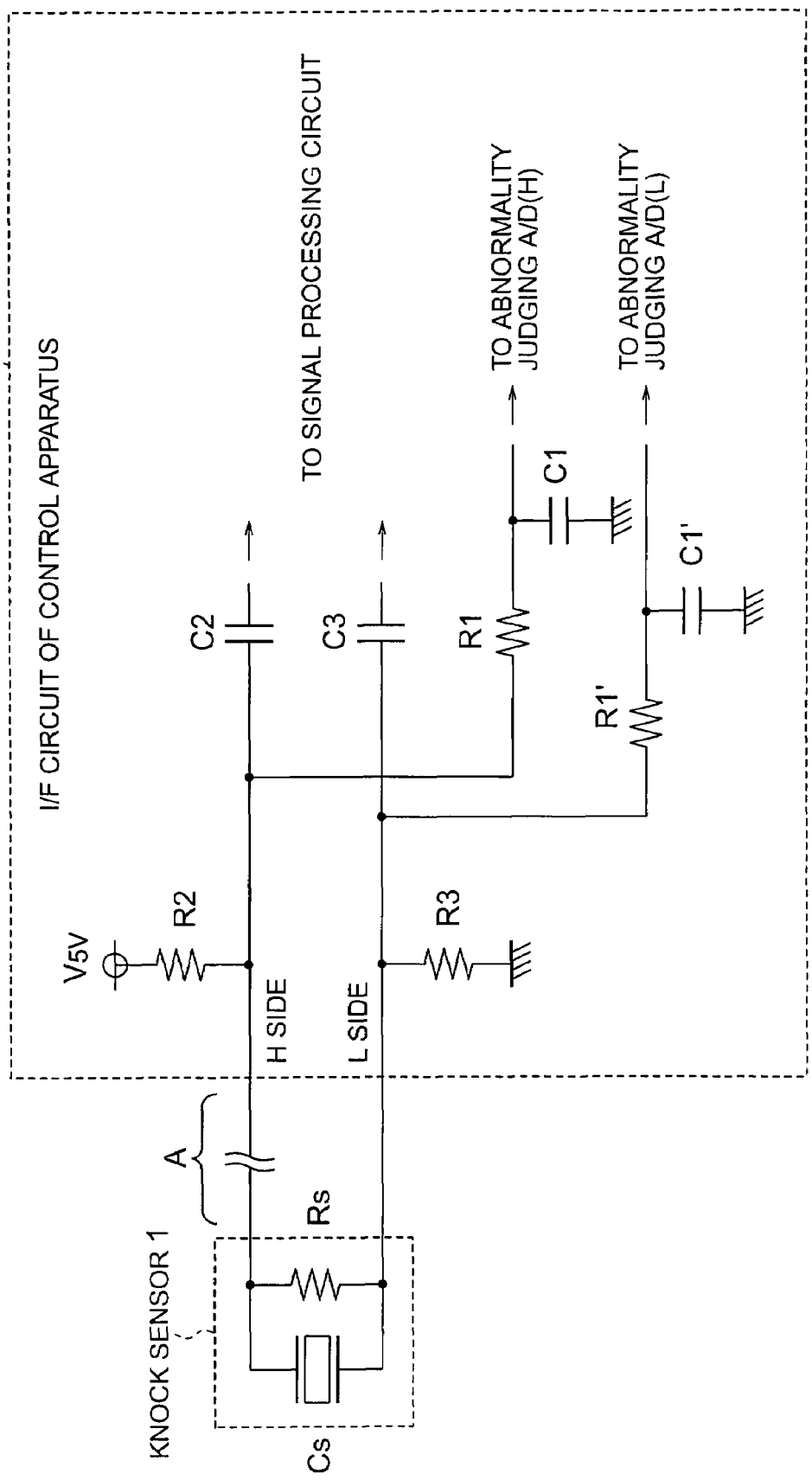
FIG. 2 is a circuit diagram showing the structure of a knock sensor and an I/F circuit portion in a control apparatus for an internal combustion engine in accordance with a second embodiment of the present invention.

FIG. 2 is a circuit diagram showing the structure of a knock sensor and an I/F circuit portion in a control apparatus for an internal combustion engine in accordance with the second embodiment of the present invention. In the second embodiment, as shown in FIG. 2, a resistor Rs is built in a knock sensor 1, and the built-in sensor Rs is connected in parallel with a piezoelectric element Cs. Both terminals of the knock sensor 1 are connected to an I/F circuit 12 of the control apparatus through a harness indicated by reference A in the figure in a state where both of the terminals are isolated from a constant voltage system such as the ground level.

In the I/F circuit 12 of the control apparatus, resistors R2 and R3 structure a bias means, and an output signal from one terminal of the knock sensor 1 is pulled up to 5 V through the resistor R2 having the same resistance as that of the built-in resistor Rs of the knock sensor 1. An output signal from the other terminal of the knock sensor 1 is pulled down to the ground level through the resistor R3 having the same resistance as that of the built-in resistor Rs of the knock sensor 1, to thereby conduct biasing.

Also, reference R1 and C1, R1' and C1' designate resistors and capacitors each of which structure a low pass filter for removing an alternating current component, and direct current components of the bias means which have passed through those filters are outputted to abnormality judging A/Ds of high level and low level which detect the abnormality of the knock sensor 1, respectively. In addition, reference C2 and C3 designate capacitors used for allowing only alternating current components to pass therethrough, and signals that have passed through the capacitors C2 and C3 are outputted to a signal processing circuit that detects the knock.

With the structure shown in FIG. 2, when the abnormality occurs in the harness portion indicated by reference A in the figure, the abnormality judging A/D (H) value and the abnormality judging A/D (L) value which are outputted to the abnormality judging A/D (H) of a high level and the abnormality judging A/D (L) of a low level, respectively, can obtain values shown in Table 2. In Table 2, the A/D value added with a star mark exhibits a value at the time when a voltage at a short circuiting time (usually, a battery voltage) is 10 V or higher, but it is needless to say that, when the battery voltage drops, the abnormality can be accurately judged by correcting the A/D value.

TABLE 2

| State | A/D (H) value | A/D (L) value |
|---|---|---|
| Normal | 3.3 V | 1.7 V |
| Power supply short circuiting (H) | 5 V | 5 V☆ |
| Power supply short circuiting (L) | 5 V | 5 V |
| Grounding (H) | 0 V | 0 V |
| Grounding (L) | 2.5 V | 0 V |
| Breaking | 5 V | 2.5 V |
| Between-two-line short circuiting | 2.5 V | 2.5 V |

In this way, when a bias voltage is given, even in the two line type sensor of the type that outputs sensor signals by means of two lines which are isolated from a constant voltage system such as the ground level, it is possible to surely discriminate the abnormal states of the short circuiting, grounding, breaking, and between-two-line short circuiting.

Therefore, according to the second embodiment, the abnormality of the knock sensor of the two line type is discriminatable with a simple structure, thereby making it possible to discriminate the abnormality of power supply short-circuiting that is low in the event probability but may develop into a serious accident, the abnormality of breaking which is relatively high in the event probability but can surely conduct the fail safe processing, and other abnormalities.

Third Embodiment

In the above-mentioned second embodiment, the knock sensor 1 is of the type that sends outputs from two lines, and this type requires two abnormality judging A/D ports. For example, in the case of using only the abnormality judging A/D at an H side, it is impossible to distinguish the abnormality between short circuiting and breaking and between grounding (L side) and between-two-line short circuiting. circuit example in which even if the knock sensor1 is the two line type sensor, the abnormal state of the short circuiting, grounding, breaking, and between-two-line short circuiting can be discriminated by one A/D port as in the conventional apparatus. In this case, the bias means of the I/F circuit pulls up one end of the knock sensor 1, pulls down the other end, and connects both of the ends through a resistor for conducting biasing.

Figure 3:
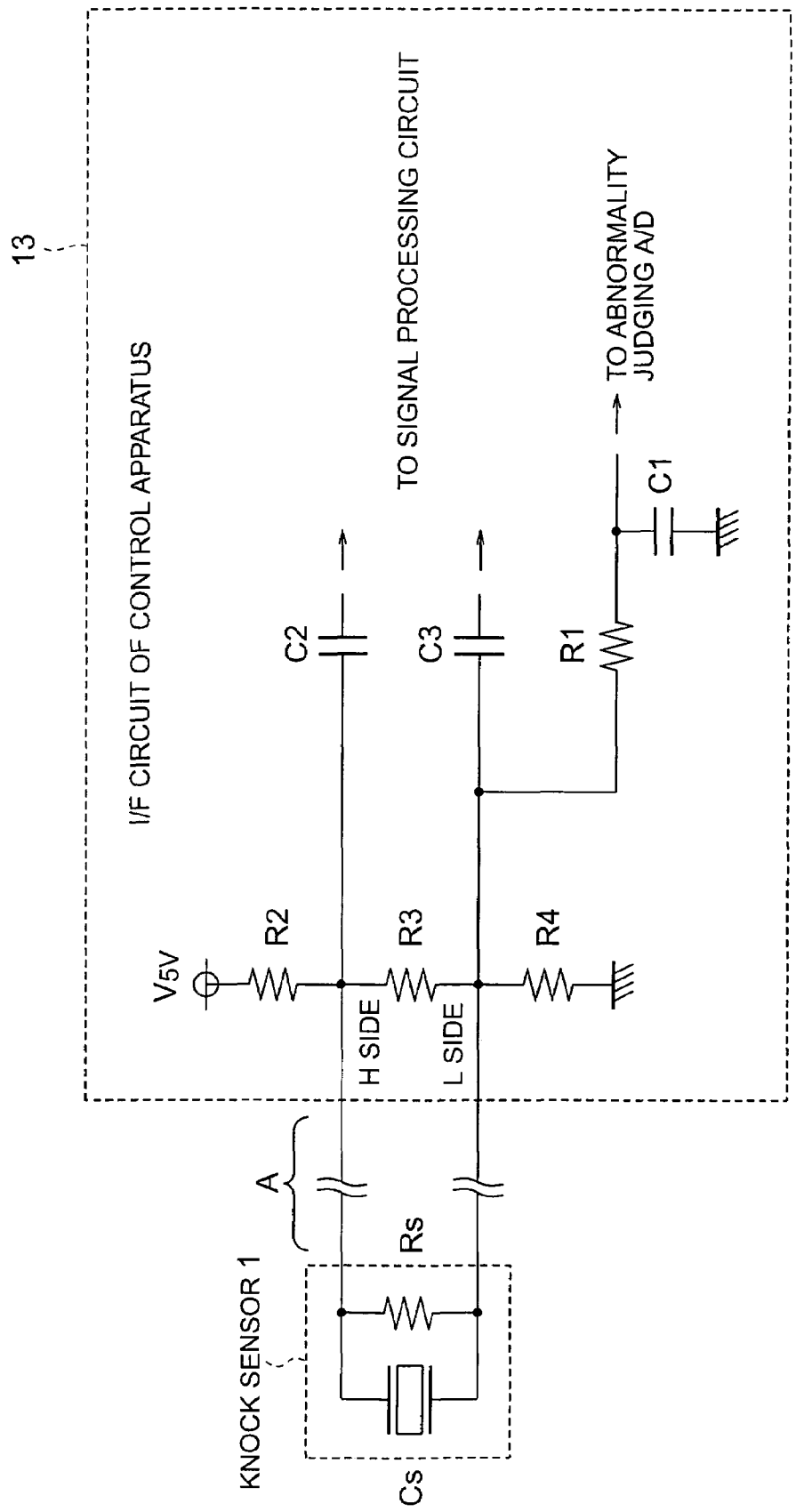
FIG. 3 is a circuit diagram showing the structure of a knock sensor and an I/F circuit portion in a control apparatus for an internal combustion engine in accordance with a third embodiment of the present invention.

FIG. 3 is a circuit diagram showing the structure of a knock sensor and an I/F circuit portion in a control apparatus for an internal combustion engine in accordance with the third embodiment of the present invention. In the third embodiment, as shown in FIG. 3, a resistor Rs is built in a knock sensor 1, and the built-in sensor Rs is connected in parallel with a piezoelectric element Cs. Both terminals of the knock sensor 1 are connected to an I/F circuit 13 of the control apparatus through a harness indicated by reference A in the figure in a state where both the terminals are isolated from a constant voltage system such as the ground level.

In the I/F circuit 13 of the control apparatus, one terminal of the knock sensor 1 is pulled up to 5 V through a resistor R2 having the same resistance as that of the built-in resistor Rs of the knock sensor 1, the other terminal of the knock sensor 1 is pulled down to the ground level through a resistor R4 having the same resistance as that of the built-in resistor Rs of the knock sensor 1, and both the terminals are connected to each other through a resistor R3 having a resistance larger than that of the built-in resistor Rs.

Also, reference R1 and C1 designate a resistor and a capacitor which structure a low pass filter for removing an alternating current component, and a direct current component of the bias means which has passed through the filter is outputted current component of the bias means which has passed through the filter is outputted to an abnormality judging A/D that detects the abnormality of the knock sensor 1. In addition, reference C2 and C3 designate capacitors used for allowing only alternating current components to pass therethrough, and signals that have passed through the capacitors C2 and C3 are outputted to a signal processing circuit that detects the knock.

In the structure shown in FIG. 3, in the case where the resistances of the resistors Rs, R2, R3, and R4 are values shown in Table 3, the abnormality judging A/D values when the abnormality occurs in the harness portion indicated by reference A in the figure can obtain values shown in Table 4. In Table 4, the A/D value added with a star mark exhibits a value when a voltage at the time of short circuiting (normally, a battery voltage) is 10 V or higher, and it is needless to say that the abnormality can be accurately judged by correcting the A/D value when the battery voltage drops.

TABLE 3

| Resistor designation | Resistance |
|---|---|
| Rs [kΩ] | 560 |
| R2 [kΩ] | 560 |
| R3 [kΩ] | 2,000 |
| R4 [kΩ] | 560 |

TABLE 4

| State | A/D value |
|---|---|
| Normal | 1.8 V |
| Breaking | 0.9 V |
| Power supply short circuiting (H) | 5 V☆ |
| Power supply short circuiting (L) | 5 V |
| Grounding (H) | 0 V |
| Grounding (L) | 0 V |
| Between-two-line short circuiting | 2.5 V |

In this way, when a bias voltage is given, even in the two line type sensor of the type that outputs sensor signals by means of two lines which are isolated from a constant voltage system such as the ground level, it is possible to surely discriminate the abnormal states of the short circuiting, grounding, breaking, and between-two-line short circuiting by means of one A/D port as in the conventional apparatus.

Therefore, according to the third embodiment, the abnormality of the knock sensor of the two line type is discriminatable with a simple structure, thereby making it possible to discriminate the abnormality of power supply short-circuiting that is low in the event probability but may develop into a serious accident, the abnormality of breaking which is relatively high in the event probability but can surely conduct the fail safe processing, and other abnormalities.

In the description of the first to third embodiments, for simplification of description, there is shown an example in which pulling up and pulling down are conducted with a resistor having the same resistance as that of the built-in resistor Rs of the knock sensor 1. However, it is not always necessary that those resistances be the same value as that of the built-in resistor of the knock sensor 1, and the pulling up and pulling down resistors have the same resistance. Also, in the above description, the abnormality occurs in the harness portion, but the same holds true for the case where the abnormality occurs in a connector portion or a sensor portion.

What is claimed is:

1. A control apparatus for an internal combustion engine which controls an ignition timing on the basis of the detection of a knock, comprising:
    a knock sensor having a piezoelectric element for detecting vibrations that are generated in the internal combustion engine, and a resistor that is connected in parallel with the piezoelectric element; and
    an interface circuit that detects a knock in accordance with an output from the knock sensor and detects an abnormality of the knock sensor,
    wherein the interface circuit includes a bias means that conducts biasing by pulling up and pulling down an output from the knock sensor, and detects the abnormality of the knock sensor with a direct current component of the bias means.

2. A control apparatus for an internal combustion engine according to claim 1, wherein
    the knock sensor has one end connected to a constant voltage system of a ground level and sends an output from one line of only the other end of the knock sensor.

3. A control apparatus for an internal combustion engine according to claim 1, wherein:
    the knock sensor sends outputs from two lines in a state where both of the ends of the knock sensor are isolated from a constant voltage system of the ground level; and
    the bias means of the interface circuit pulls up one end of the knock sensor and pulls down the other end of the knock sensor, to thereby conduct biasing.

4. A control apparatus for an internal combustion engine according to claim 1, wherein:
    the knock sensor sends outputs from two lines in a state where both of the ends of the knock sensor are isolated from a constant voltage system of the ground level; and
    the bias means of the interface circuit pulls up one end of the knock sensor and pulls down the other end of the knock sensor, and connects both ends of the knock sensor through a resistor for conducting biasing.

* * * * *